United States Patent Office 2,975,035
Patented Mar. 14, 1961

2,975,035
PROCESS FOR REMOVING OZONE FROM A GAS MIXTURE CONTAINING OZONE AND OXYGEN

Gerhard A. Cook, Clarence, N.Y., assignor to Union Carbide Corporation, a corporation of New York No Drawing. Filed Nov. 19, 1956, Ser. No. 622,747

2 Claims. (Cl. 23—222)

This invention relates to liquid ozone solutions, and more particularly concerns homogeneous ozone solutions which are convenient to handle.

Heretofore, no solvent except liquid oxygen has been known to absorb more than about 1% of ozone. One of the principal disadvantages of using liquid oxygen as a diluent for ozone is that in the event the container breaks, the liquid oxygen quickly evaporates, leaving behind the concentrated explosive liquid ozone. Another disadvantage lies in the fact that when ozone is allowed to react with valuable organic compounds to produce valuable products, the oxygen present may also react, giving undesirable by-products, and using up valuable raw material. A third disadvantage is that when the ozone is allowed to react with volatile organic compounds, or compounds dissolved in volatile solvents, the oxygen may form readily combustible or explosive mixtures with the vapors of the organic compounds and/or solvents.

It is, therefore, an important object of the present invention to provide convenient means for handling ozone in fairly concentrated liquid form in the absence of substantial quantities of oxygen.

Another object of the present invention is to provide a new and improved solution of ozone and a diluent in which oxygen is not present in significant amounts.

Yet another object of the present invention is to provide a solution of ozone wherein the dangers encountered by volatilization of the diluent are reduced.

A further object is to provide, in the production of ozone from oxygen, a method of separating oxygen from ozone having improved features of safety.

Other objects, features and advantages of the present invention will be apparent from the following detailed description.

My invention contemplates dissolving ozone in one or more liquefied gases which are miscible iand compatible with ozone within the proportions covered by the invention, whereby higher concentrations of ozone in inert solvents may be employed than has heretofore been the practice, without encountering the dangers and difficulties inherent in present day ozone products.

The attainment of fairly concentrated non-explosive ozone is accomplished in the present invention by incorporating ozone with one or more liquid diluents having a chemical compatibility for ozone. The liquid diluent should be suitably miscible with and chemically inert to ozone to make a homogeneous solution. It should be free of explosive-producing stimuli such as hydrocarbons and other reactive organic impurities.

Among the ozone diluents that may be employed in the practice of the invention, either singularly or in combination, are liquefied perhalogenated, fluorine-containing methanes in which the halogen substituent is either fluorine or fluorine and chlorine. Stated in other terms, the ozone diluent may be fully substituted methanes, whose structures can be represented by the formula: $C(Cl)_a(F)_b$, where $a$ is an integer having a value of from 0 to 3, and $b$ is an integer having a value of from 1 to 4, with the sum of $a$ and $b$ being 4.

Liquid trifluoromonochloromethane is a preferred solvent in the practice of the invention, because of its relatively low freezing temperature (between −181° C. and −174° C., depending upon purity), and because the freezing point of solutions of ozone in this solvent are even lower, being below −183° C. when the ozone concentration is substantial. Thus, liquid oxygen (B.P. −183° C.) can conveniently be used as an external refrigerant for such solutions while still permitting them to remain fluid. At temperatures slightly above its freezing point, the trifluorochloromethane removes or scrubs out substantially all of the ozone from a gas stream that bubbles through it, whereas the solvent has only a slight absorbing capacity for oxygen. At these low temperatures the vapor pressures of ozone within the solution are less than 1 mm. of mercury, being less than 0.1 mm. of mercury at −183° C. It should be recognized that a number of other liquid halogen-substituted hydrocarbons will also dissolve substantial quantities of ozone, and are satisfactory in most respects, but these suffer from the disadvantage that ozone tends to react with the C—H bonds and the C—C bonds, especially if the solution is subjected to sparking or other sources of energy.

For illustrative purposes the invention will be described principally in connection with the ozone-trifluorochloromethane solutions. However, it is to be understood that this is not intended to limit the scope of the invention.

According to the invention, I have discovered that liquid trifluorochloromethane is admirably suited as a diluent for ozone. The trifluorochloromethane diluent is chemically inert to ozone, and forms a homogeneous solution therewith, over a wide range of composition. A concentration up to approximately 14% ozone by weight (26.5 mole percent) is preferred, since tests have shown that the danger of explosion when the solution is subjected to sparks or other strong stimuli at this concentration is practically nil. However, it is to be understood that the invention is not intended to be restricted to "safe" mixtures, but is susceptible of application in all mixtures of ozone and fluorinated methane solvents having a homogeneous composition. Actually ozone concentrations much higher than 14% by weight are compatible and miscible with liquid trifluorochloromethane, but have been found to explode when artificially stimulated by a sufficiently powerful spark.

In the practice of the present invention, it is desirable that the liquid solution of ozone and trifluorochloromethane be maintained as close to the freezing point of the solution as possible to minimize loss of ozone from the solution by evaporation, and to minimize the rate of spontaneous ozone decomposition. For purposes of this invention in the preparation, handling, transportation and storage of ozone solutions, a temperature between about −184° C. and −174° C. has been found to be most desirable, although higher or lower temperatures may be employed if so desired.

To prepare the ozone solution of the invention, an oxygen-containing gas, for example air or oxygen, is passed through an ozone generator and converted in part into ozone. The resultant gas mixture, containing a relatively small percentage of ozone, is bubbled through liquid trifluorochloromethane. The ozone is absorbed by the trifluorochloromethane along with small amounts of oxygen, and the remainder of the gas mixture may be recycled to the ozone generator, in which case make-up oxygen is added, or disposed of in any way desired. Relatively little oxygen will dissolve in the ozone diluent during the initial stage of separation. As the ozone concentration builds up, more oxygen will be retained in the diluent because of the solvent power of ozone for oxygen. However, the oxygen is present only as a minor, incidental ingredient, not exceeding about 10% by weight of the solution, so that its pressure, for all intents and purposes, will not significantly affect the stability, homogeneity or other important properties of the ozone solution. If desired, the oxygen concentration may be reduced to less than 1% by reducing the pressure over the solution by means, for example, of a vacuum pump.

High concentrations of ozone gas may be conveniently obtained from solutions of ozone in perhalogenated methanes by warming the solution, and mixtures of ozone with other gases can be readily prepared. If the solutions are allowed to warm up to a point at which the ozone partial pressure exceeds about 75 mm. of mercury, there is the possibility of an explosion in the gas phase, set off by a static spark or other stimulus. By pumping off ozone gas from solutions in the halogenated methanes while keeping the partial pressure of ozone in the vapor phase below about 75 mm. of mercury, explosions can usually be avoided. Alternatively, the ozone may be swept out of solution by a carrier gas such as nitrogen or argon, again keeping the partial pressure of ozone below about 75 mm. of mercury to avoid the possibility of gas-phase explosions.

The ozone solution of the invention is a convenient means of mixing liquid ozone with a solvent without necessarily degrading the chemical reactivity of the ozone therein. It also helps to overcome a formidable safety handicap in the handling, storage, transportation and chemical reaction of ozone. The solution of the invention is useful as a source of ozone for carrying out chemical reactions by introducing the ozone into a reaction zone in a diluent which is substantially free from oxygen, or by vaporizing concentrated ozone from solution into the reaction zone.

In order to indicate still more fully the nature of the present invention, the following typical examples are set forth, it being understood that these examples are presented as illustrative only, and are not intended to limit the scope of the invention.

*Example I*

A solution of ozone in liquid difluorodichloromethane was prepared by bubbling a gaseous mixture of ozone and oxygen through the solvent at a temperature slightly above its melting point (about −149° C.). Later on, the operation was carried out at lower temperatures made possible by the lowering of the melting point by the presence of ozone. The liquid solution was then thoroughly mixed and a spark was passed through it. A number of tests were made, the tests being carried out while the solution was allowed to warm up from −175° C. to about −58° C. From these tests it was determined that the lowest ozone concentration at which an explosion occurred was 14 weight percent. Solutions of ozone having an ozone concentration of about 48.5 mole percent were readily prepared.

*Example II*

In a manner similar to the method outlined in Example I, samples of ozone in liquid trifluorochloromethane were also produced and tested with high voltage sparks underneath the liquid level. The lowest ozone concentration at which an explosion occurred was 17 weight percent (32 mole percent) at −183° C. Samples containing 21.6, 24.2, 39.0, 40.6 mole percent ozone were subjected to heavy impact at −183° C. with negative results. A spark test was made on a 41.4 mole percent solution at −196° C. without producing an explosion. On the other hand, a spark passed through a 46.8% ozone solution at −183° C. produced a violent explosion. Concentrations of 49 mole percent solutions of ozone in trifluorochloromethane were readily prepared at −183° C.

Results of these tests indicated that at ozone concentrations up to 14 weight percent the solutions did not explode. The lowest concentration at which the explosion occurred was 14.0 weight percent for difluorodichloromethane and 17 weight percent for trifluorochloromethane.

From the above description it will be seen that ozone may be incorporated in a solvent other than oxygen, and still form a homogeneous solution, which is convenient for handling ozone in fairly concentrated form. The ozone solvent may comprise a liquefied, perhalogenated, fluorine-containing methane, the halogen substituent being either fluorine or chlorine. An obvious advantage of the ozone solution of the invention is the factor of safety. The invention is admirably suited as an intermediate in the separation of ozone and oxygen, as well as in the handling, storage, transportation, and chemical reaction of ozone.

It will be understood that modifications and variations may be effected without departing from the spirit and scope of the novel concepts of the present invention.

What is claimed is:

1. A process for removing ozone from a gas mixture containing ozone and $O_2$ comprising flowing said gas mixture in intimate contact with a liquefied perhalogenated fluorine-containing methane selected from the group consisting of difluorochloromethane and trifluorochloromethane, whereby said ozone constituent is absorbed by said perhalogenated methane to form a stable homogeneous solution and separating the ozone depleted gas mixture from said perhalogenated methane; and simultaneously maintaining said solution at a temperature between −174° C. and −184° C. to keep the absorbed ozone in a liquid state and maintaining the ozone vapor pressure below about 75 mm. of mercury; and maintaining the ozone concentration of said homogenous solution below about 14 percent by weight.

2. In the manufacture and production of ozone from a gas mixture containing ozone and $O_2$, a cycle for separating the ozone from said oxygen and recovering the oxygen for re-use in said cycle comprising passing the oxygen-containing gas through an ozone generator to convert part of the oxygen to ozone; blowing the resulting gas mixture in contact with a liquefied perhalogenated fluorine-containing methane selected from the group consisting of difluorochloromethane and trifluorochloromethane whereby said ozone constituent is absorbed by said liquid perhalogenated methane to form a stable homogeneous solution and separating the ozone depleted gas mixture from said perhalogenated methane; providing an amount of make-up oxygen corresponding to the amount of oxygen previously converted to ozone; re-circulating the remaining oxygen-containing gas and said make-up oxygen through said ozone generator for further ozonization; maintaining the ozone concentration of said homogeneous solution below about 14 percent by weight; and maintaining the homogeneous ozone-containing liquid perhalogenated methane solution during said ozone absorption in a refrigerated state below the temperature at which the ozone vapor pressure is about 75 mm. of mercury.

References Cited in the file of this patent

UNITED STATES PATENTS 2,704,274     Allison _____ Mar. 15, 1955

FOREIGN PATENTS 729,010     Great Britain _____ Apr. 27, 1955

OTHER REFERENCES

Babor et al.: "General College Chemistry," 1940, pages 227–229.